United States Patent [19]

Nishida et al.

[11] 4,380,096
[45] Apr. 19, 1983

[54] HOSE CLAMP

[75] Inventors: Haruki Nishida, Ishibashi; Nobuya Shinozaki, Mooka, both of Japan

[73] Assignees: Nissan Motor Co., Ltd.; Kato Hatsujo Kaisha., Ltd., both of Yokohama, Japan

[21] Appl. No.: 283,067

[22] Filed: Jul. 13, 1981

[51] Int. Cl.³ .................. B65D 63/02; F16L 33/02
[52] U.S. Cl. .................................. 24/20 R; 248/74 B
[58] Field of Search ............... 24/20 R, 20 S, 20 LS, 24/20 EE, 20 TT, 20 CW, 22, 23 R, 256, 279; 248/74 B

[56] References Cited

U.S. PATENT DOCUMENTS 580,199   4/1897  Sommerfeld .................. 24/20 EE
4,305,179 12/1981 Sakurada ...................... 24/22 X

FOREIGN PATENT DOCUMENTS 1560606  2/1980  United Kingdom ............... 24/20 R Primary Examiner—Robert P. Swiatek
Attorney, Agent, or Firm—George B. Oujevolk

[57] ABSTRACT

A hose clamp which has an expanding portion of increased width at predetermined parts of a clamping portion is so formed as to produce a constant stress caused by the bending moment of forces and the axial force acting on the position where the maximum stress is applied to the clamping portion. The hose clamp has a first gripping end portion and a pair of second gripping end portions to expand the diameter of the clamping portion. Plastic deformation is prevented at the time of expanding the diameter of the clamping portion of the hose clamp.

1 Claim, 12 Drawing Figures

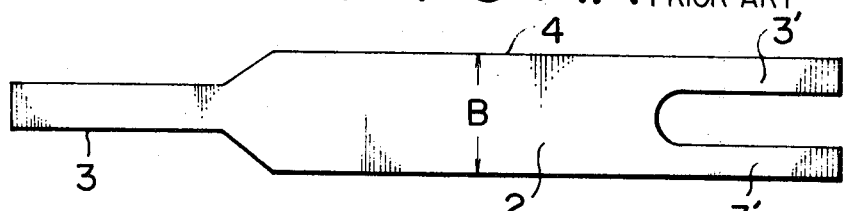
FIG. IA PRIOR ART
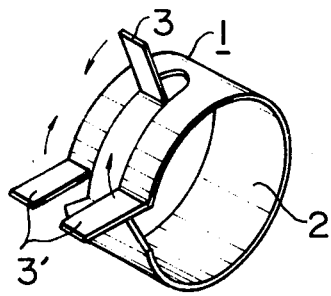
FIG. IB PRIOR ART
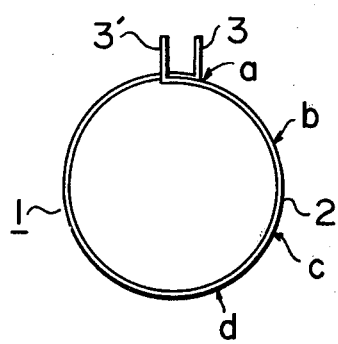
FIG. 2 PRIOR ART
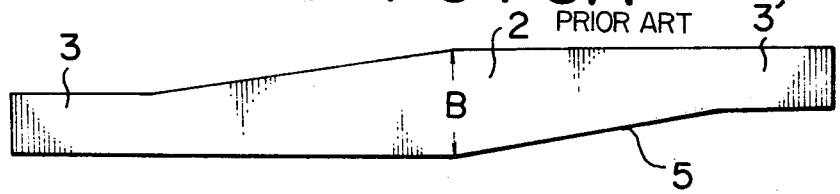
FIG. 3A PRIOR ART
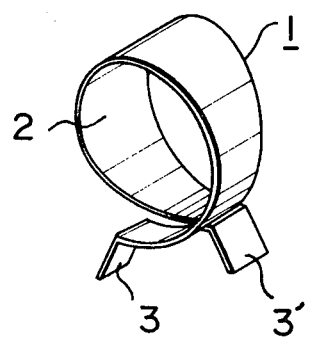
FIG. 3B PRIOR ART

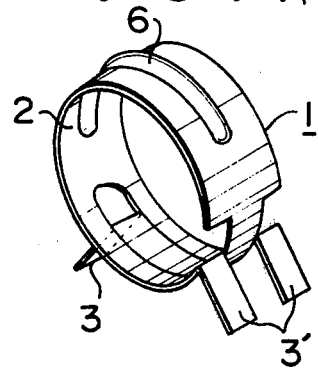
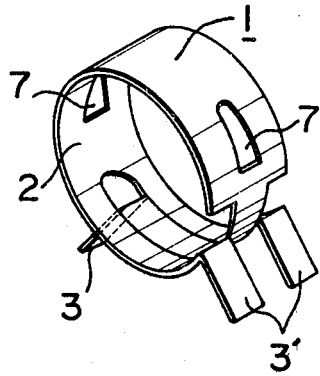
FIG.4 PRIOR ART    FIG.5 PRIOR ART
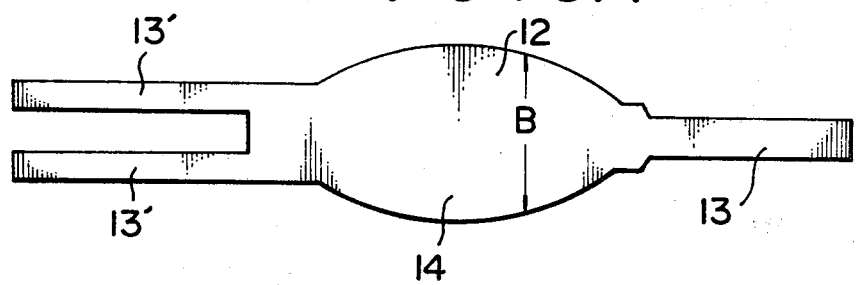
FIG.6A
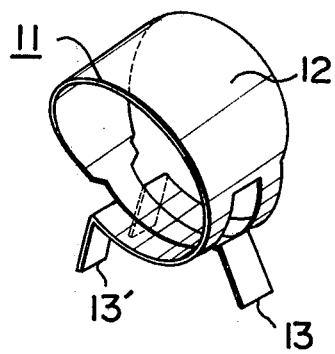
FIG.6B 4,380,096

HOSE CLAMP

BACKGROUND OF THE INVENTION

The present invention relates to a clamping arrangement and, more particularly, to an improvement in a hose clamp formed of an elastic flat plate material.

BRIEF DESCRIPTION OF THE PRIOR ART

A conventional hose clamp, generally designated by reference numeral 1 has, as shown, in FIGS. 1A and 1B, an annular clamping portion 2 which is formed by bending an elastic flat plate material 4 having a constant width B and a rectangular cross section, a first gripping end portion 3, and a pair of second gripping end portions 3' and 3' designed to expand the diameter of the clamping portion 2.

When the hose clamp 1 thus formed is used, a hose is clamped by means of the elastic force of the hose clamp 1 itself by the steps of approaching the first gripping end portion 3 and the second gripping end portions 3' and 3' as shown by the arrows in FIG. 1B therebetween against the elastic force of the hose clamp 1 so as to thereby expand the diameter of the clamping portion 2. A hose (not shown) is then inserted into the expanding central space of the clamping portion 2 and then gripping end portions 3 and 3', 3' are released. It is however matters of common knowledge that, when the first and second gripping end portions 3 and 3', 3' are thus brought near each other to expand the diameter of the clamping portion 2 as described above, different stresses are produced at different positions such as, for example, at the respective positions designated by reference characters a, b, c and d by the mechanical force of the clamping portion 2. That is, larger stresses are produced sequentially in order at the positions a, b, c and d of the clamping portion 2. It is accordingly a large disadvantage of the conventional hose clamp that, as the clamping force is increased, the stress at the position d of the clamping portion 2 is particularly at a maximum and the clamping portion 2 is frequently plastically deformed so as to cause the position d to break.

Accordingly, there have been developed and proposed a hose clamp which, as shown in FIGS. 3A and 3B, employed an elastic flat plate 5 in which the width B of the clamping portion 2 is rectilinearly varied, another hose clamp which, as shown in FIG. 4, adopted a reinforcing rib 6 generally formed at a central portion on the outer peripheral surface of the position where the higher stress of the clamping portion 2 is produced and the other hose clamp which, as shown in FIG. 5, has a generally triangularly shaped slit 7 perforated in the vicinity of the first and second gripping end portions 3 and 3', 3' where there are lower deformation resistances than the clamping portion 2. However, all these hose clamps thus proposed to eliminate the disadvantages of the conventional hose clamps were not constructed by accurately considering the bending moment and the axial force produced at the respective positions on the clamping portion 2 owing to the clamping force of the gripping end portions. Consequently, the stresses were largely varied at the respective positions on the clamping portions of the hose clamps. There is thus the possibility of plastic deformation caused over the allowable stress on the clamping portion at the time of expanding the diameter of the clamping portion of conventional hose clamps. In addition, the conventional hose clamps have difficulty in retaining the roundness of the clamping portion at the time of clamping a hose.

SUMMARY OF THE INVENTION

Accordingly, a primary object of this invention is to provide a hose clamp which eliminates the aforementioned disadvantages of the conventional hose clamp.

Another object of this invention is to provide a hose clamp which can prevent the plastic deformation produced in the conventional hose clamp at the time of expanding the diameter of the clamping portion.

Yet another object of this invention is to provide a hose clamp which can be very easily formed in a desirable shape.

A further object of this invention is to provide a hose clamp which can equalize the stresses produced at different positions on the clamping portion thereof.

Still another object of this invention is to provide a hose clamp which can retain the roundness of the clamping portion even at the time of clamping a hose.

According to one aspect of this invention, there is provided an improved hose clamp which has a swelled portion of increased width at a part of the clamping portion so formed as to make constant the stress caused by the bending moment and the axial force.

The foregoing and other objects and features of the invention will be apparent from the following detailed description and the accompanying drawings, in which:

BRIEF DESCRIPTION OF THE DRAWINGS

FIGS. 1A and 1B are plan and perspective views of the developed and the assembled state of the conventional hose clamp;

FIG. 2 is an explanatory view of various locations of the clamping portion of the conventional hose clamp;

FIGS. 3A and 3B are views similar to FIGS. 1A and 1B but showing another example of the conventional hose clamp;

FIGS. 4 and 5 are perspective views of other conventional hose clamps;

FIG. 6A is a plan view of one preferred embodiment of the hose clamp constructed according to this invention;

FIG. 6 is a perspective view of the hose clamp of this invention;

DESCRIPTION OF THE PREFERRED EMBODIMENTS

Figure 7A:
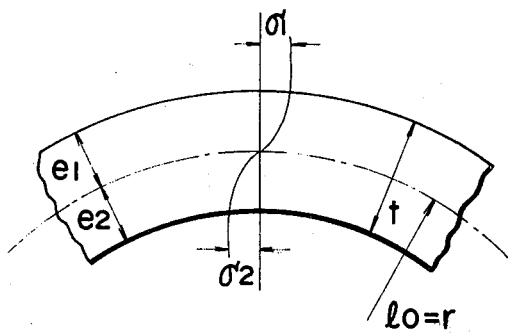
FIG. 7A and 7B are diagrams for the explanatory purpose of calculation formulae for obtaining the stresses at different positions on the clamping portion of the hose clamp.

Referring now to the drawings, particularly to FIGS. 6A and 6B showing one preferred embodiment of the hose clamp contemplated herein which generally designated by reference numeral 11, consists of an annular clamping portion 12 which is formed, as shown in FIG. 1B by continuously bending an elastic flat plate material 14 shown in shape in FIG. 1A by a press or a forming machine in a shape corresponding to the circle having an outer diameter of a hose to be inserted into the central space and to be clamped. There is a first gripping end portion 13 and a pair of second gripping end portions 13' and 13' for gripping to expand the diameter of the clamping portion 12. The width B of the clamping portion 12 forming the hose clamp 11 of this invention is obtained as hereinafter described.

Figure 7B:
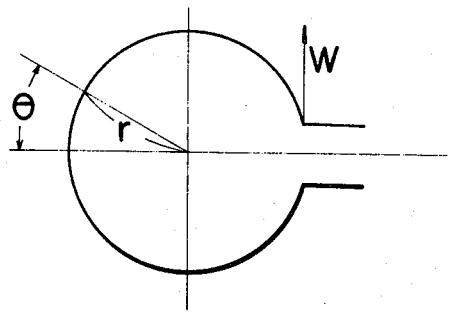
Figure 8:
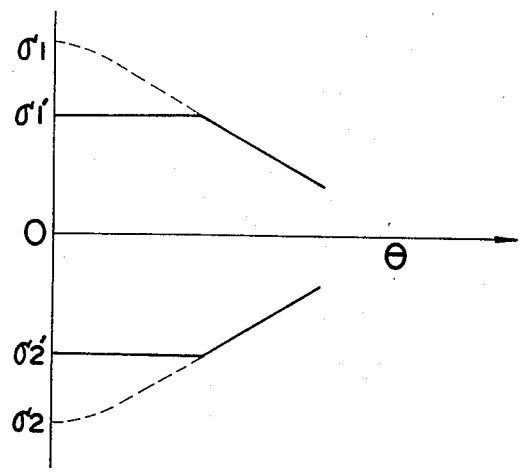
FIG. 8 is a diagram showing the stresses at various angles on the clamping portion of the hose clamp.

Stresses $\delta_1$ and $\delta_2$, which represent the stresses produced on the outer and the inner peripheral surfaces of the hose clamp 11 of this invention, are obtained by calculating them with the hose clamp 11 regarded as a "bending beam". Accordingly, the stresses $\delta_1$ and $\delta_2$ can be obtained by the following formulae:

$$\sigma_1 = \frac{N}{A} + \frac{M}{A\rho_0}\left(1 + \frac{1}{\kappa} \cdot \frac{e_1}{\rho_0 + e_1}\right) \quad (1)$$

$$\sigma_2 = \frac{N}{A} + \frac{M}{A\rho_0}\left(1 - \frac{1}{\kappa} \cdot \frac{e_2}{\rho_0 - e_2}\right) \quad (2)$$

where, in FIG. 7A,
A: Cross sectional area = width B × thickness t
N: Axial force acting on the calculated cross section
M: Bending moment acting on the calculated cross section
$\rho_0$: Radius of curvature of the neutral axis of bending beam $\rho_0 = r$ $e_1$: Distance from the neutral axis to the outer peripheral surface = t/2
$e_2$: Distance from the neutral axis to the inner peripheral surface = t/2
$\kappa$: Constant The bending moment M and the axial force N acting on the respective positions of the clamping portion of the hose clamp are obtained by the following formulae with reference to FIG. 7B.

$$M = W \cdot r(1 + \cos\theta) \quad (3)$$

$$N = W \cdot \cos\theta \quad (4)$$

where W represents the clamping force of the clamping portion when the gripping end portions 13 and 13', 13' are approached. The clamping portion 12 is so formed, as shown in FIG. 8, in equi-stress state in swelled shape having a width B obtained by the following formula at the position where the stresses $\delta_1$ and $\delta_2$ produced on the outer and the inner peripheral surfaces of the hose clamp 11 exceed a predetermined reference value such as, for example, allowable stress values $\delta_1'$ and $\delta_2'$. More particularly, the values of the M and N of the formula (3) and (4) are substituted for the formulae (1) and (2), and the width B of the clamping portion 12 of the hose clamp 11 is obtained with respect to the reference values $\delta_1'$ and $\delta_2'$ as below:

$$B = \frac{M}{\sigma'_1 rt}\left(1 + \frac{1}{\kappa} \cdot \frac{t}{2r + t}\right) + \frac{N}{\sigma'_1 t} \quad (5)$$

or $$B = \frac{M}{\sigma'_2 rt}\left(1 - \frac{1}{\kappa} \cdot \frac{t}{2r - t}\right) + \frac{N}{\sigma'_2 t} \quad (6)$$

Thus, the width of the clamping portion 12 of the hose clamp 11 at the portion where the stress value may approach its elastic limit when the width B is formed constantly is determined by calculating the formula (5) or (6) of the widths at the different positions on the clamping portion 12 as swelled portion in width B in FIG. 6A.

It is noted that the width B determined by calculating the formula (5) or (6) is not applied to all the periphery of the clamping portion 12 of the hose clamp 11, because if all the periphery of the clamping portion is formed in equi-stress state, the width B of the clamping portion 11 in the vicinity of the gripping end portions 13 and 13', 13' having low bending stress and axial force may become extremely narrow.

It should be understood from the foregoing explanation that since the hose clamp of this invention is so constructed at the clamping portion that the width and shape of the clamping portion are determined at predetermined positions where higher bending moment and axial force than predetermined values are acted by the clamping force of the gripping end portions in such a manner that the stress values calculated based on the theory of a bending beam are equalized along the beam and that accordingly, the width of the expanding portion should be according to the foregoing calculations so as to prevent the plastic deformation produced in the conventional hose clamp at the time of expanding the diameter of the clamping portion. The clamp can easily be formed in a desired shape to equalize the stresses produced at the different positions of the clamping portion and can retain the roundness of the clamping portion at the time of clamping a hose.

What is claimed is:
1. In a cylindrical hose clamp having: a central annular clamping portion formed by bending a resilient flat plate material;
with a first gripping end portion and a pair of flat parallel second gripping end portions, said second end portions defining a travel track therebetween, said first end portion having a tongue so designed as to engage and travel along said track so as to expand the diameter of said hose clamp;
the improvement therein wherein said clamping portion is formed in an expanded shape such that the width of the clamping portion where the maximum stress is applied is at a maximum so that the forces causing stress are at predetermined locations of said clamping portion, said width B of said clamping portion being obtained according to the following mathematical formula:

$$B = \frac{M}{\sigma'_1 rt}\left(1 + \frac{1}{\kappa} \cdot \frac{t}{2r + t}\right) + \frac{N}{\sigma'_1 t}$$

or $$B = \frac{M}{\sigma'_2 rt}\left(1 - \frac{1}{\kappa} \cdot \frac{t}{2r - t}\right) + \frac{N}{\sigma'_2 t}$$

where $\delta_1'$ and $\delta_2'$ represent reference stresses like allowable stresses and
M: bending moment acting on the calculated clamp cross section
N: axial force acting on the calculated clamp cross section
r: radius of curvature of the neutral axis of a bending beam under the condition that said hose clamp is regarded as a bending beam
t: thickness of said clamping portion
$\kappa$: constant.

* * * * *